Aug. 16, 1932.          L. MAMBOURG           1,872,477
                      FURNACE CONSTRUCTION
                Filed May 21, 1928      3 Sheets-Sheet 1

Inventor
Leopold Mambourg
By Frank Fraser
Attorney

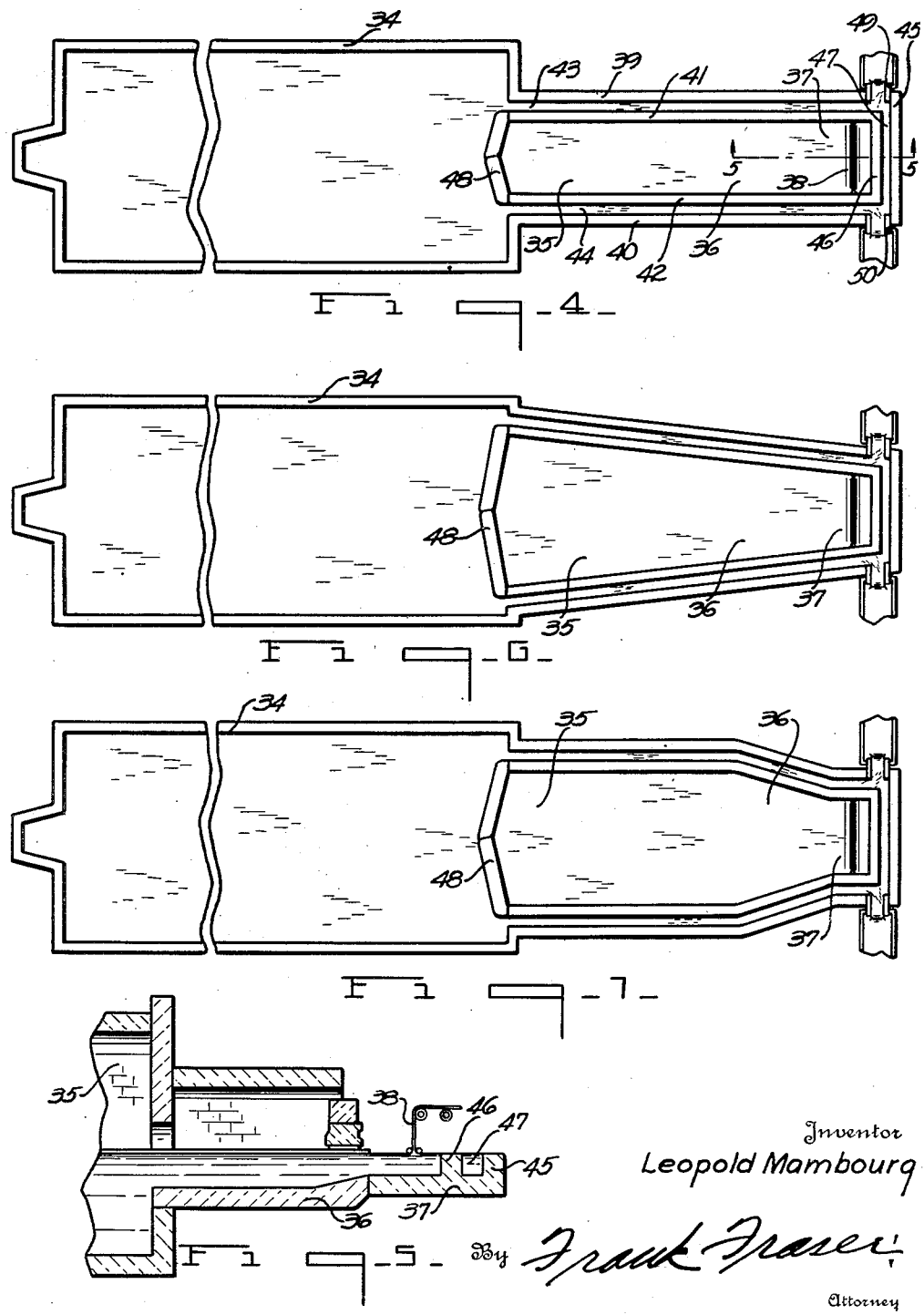

Aug. 16, 1932.       L. MAMBOURG       1,872,477
FURNACE CONSTRUCTION
Filed May 21, 1928       3 Sheets-Sheet 3
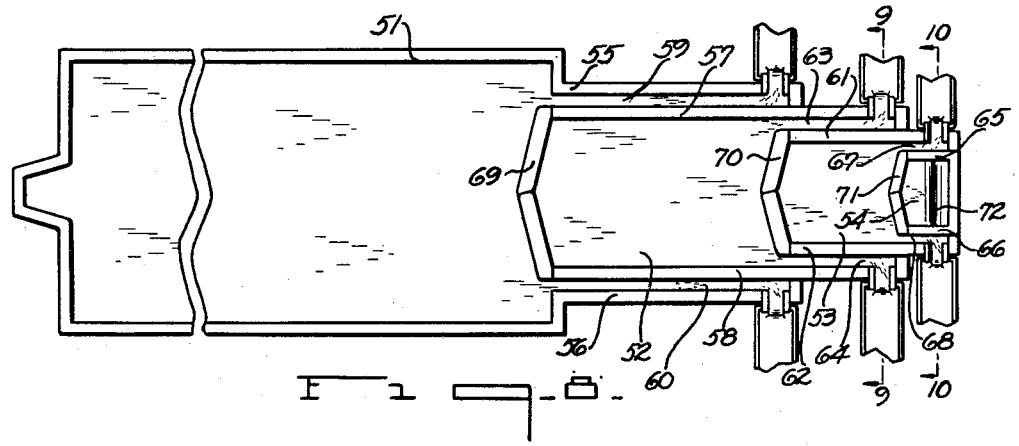
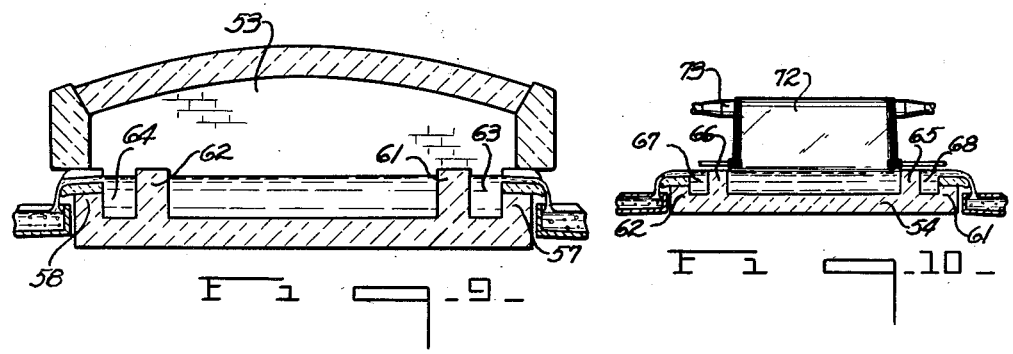
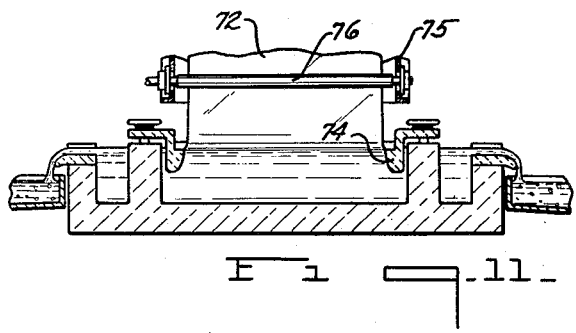
Inventor
Leopold Mambourg
By Frank Fraser
Attorney Patented Aug. 16, 1932

1,872,477

UNITED STATES PATENT OFFICE

LEOPOLD MAMBOURG, OF LANCASTER, OHIO, ASSIGNOR TO LIBBEY-OWENS-FORD GLASS COMPANY, OF TOLEDO, OHIO, A CORPORATION OF OHIO

FURNACE CONSTRUCTION

Application filed May 21, 1928. Serial No. 279,404.

This invention relates to a furnace construction and to a process for producing glass.

The improved type of furnace provided by the present invention is primarily designed for use in the melting and fining of molten glass preparatory to its being formed into a sheet although it is not necessarily restricted to such use but, on the other hand, may be utilized for the manufacture of any kind of glassware.

Heretofore, in certain classes of glass producing furnaces and especially in that type of furnace ordinarily used in the drawing of sheet glass in accordance with the Colburn process, wherein the sheet is drawn upwardly from a mass of molten glass for a suitable distance and then deflected about a bending member into the horizontal plane and passed horizontally through an annealing leer, the glass producing materials are melted in one end of a rather long tank furnace, the molten glass flowing slowly through the melting and fining portions of the furnace to the opposite end thereof where the surface glass flows in the form of a relatively thin stream or body into a shallow receptacle or pot from which the sheet is drawn.

In such furnaces as above described, there ordinarily forms upon the surface of the molten glass and usually within the melting portion of the furnace a certain amount of scum, dirt or comparatively poor quality of glass and these impurities usually have a tendency to work towards and gather along the side walls of the furnace although some defects may be scattered across the entire width thereof. Should this scum or comparatively poor quality of glass find its way into the glass sheet or other article being produced, it will naturally be very apt to cause smears, lines or other defects therein. Also, the border portions of the molten glass within the furnace do not ordinarily flow therethrough as rapidly as does the central body portion thereof, this being largely due to the resistance offered to the flow of glass by the side walls of the furnace and also because the border portions of the glass are somewhat cooler due to the dissipation of heat through the furnace side walls. Furthermore, one of the problems usually encountered in the drawing of glass in flat sheet form is that of maintaining the pool of molten glass in the drawing receptacle or pot, and from which the sheet is formed, at a uniform temperature throughout the width of said sheet, the molten glass in the center of the drawing receptacle or pot usually being somewhat hotter than the glass at the sides thereof.

The general object of the present invention is to eliminate the above objectionable features in furnaces of this type whereby the poorer quality of glass or that glass containing the principal impurities is separated from the better glass in such a manner that only the very best quality of glass will be allowed to pass into the sheet with the result that the sheet produced will be, practically speaking, free from all common glass defects such as smears, seeds, blisters, etc.

Another object of the invention is the provision of means for maintaining the molten glass in the fining and drawing portions of the furnace at a substantially uniform temperature throughout whereby to facilitate and improve the drawing of the sheet and prevent or retard stagnation and devitrification of the glass in the said fining and drawing portions.

A further object of the invention is the provision of means tending to minimize or eliminate the formation of stagnant glass within the melting portion of the furnace by creating a drag upon the edge or border portions of the glass within said melting portion whereby to insure a more or less constant movement thereof.

Other objects and advantages of the invention will become more apparent during the course of the following description when taken in connection with the accompanying drawings.

In the drawings forming a part of this application and wherein like numerals are employed to designate like parts throughout the same.

Fig. 4 is a top plan view of a modified design of furnace embodying the principles of the present invention.

Fig. 5 is a transverse section taken substantially on line 5—5 of Fig. 4.

Figs. 6, 7 and 8 are top plan views showing different modified designs of furnaces.

Fig. 9 is a transverse section taken substantially on line 9—9 of Fig. 8.

Fig. 10 is a transverse section taken substantially on line 10—10 of Fig. 8 showing the sheet being drawn in accordance with the Colburn process, and Fig. 11 is a view somewhat similar to Fig. 10 but showing the sheet being drawn in accordance with the so-called Fourcault process.

Figure 1:
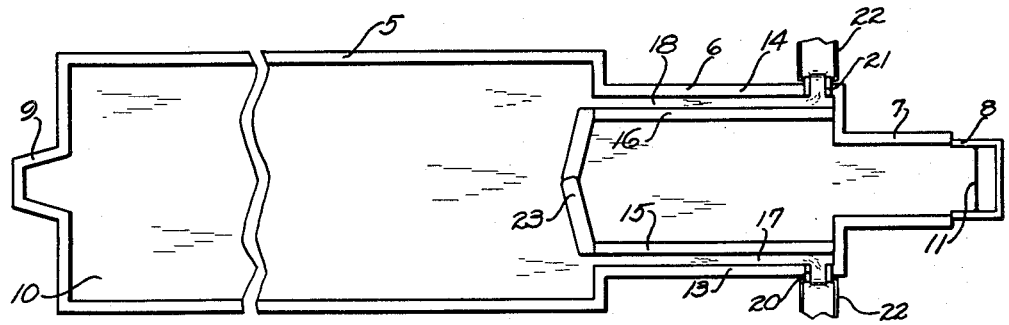
Fig. 1 is a top plan view of a furnace construction embodying the present invention.
Figure 2:
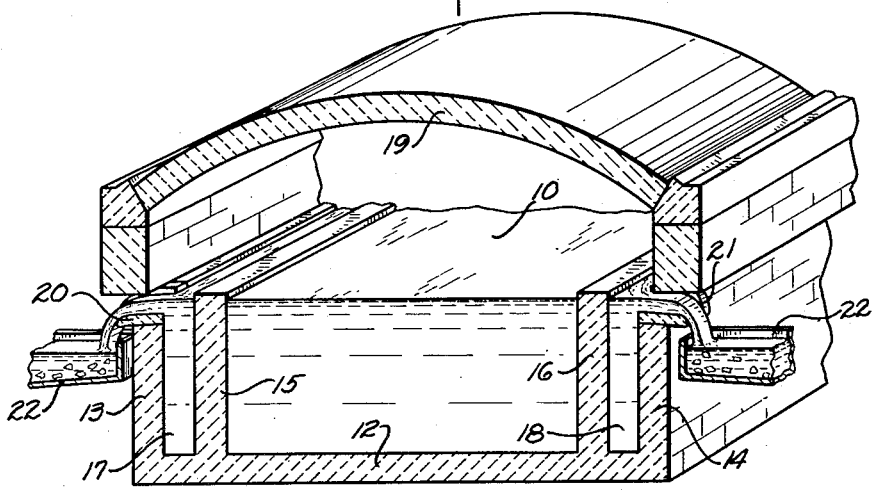
Fig. 2 is a detail perspective sectional view through the fining portion of the furnace.

Referring to the drawings and particularly to Figs. 1 and 2, there is disclosed a continuous tank furnace including a melting end or tank 5, a refining end or chamber 6 connected with one end of the melting tank 5, a cooling chamber 7 connected with the refining chamber 6 and a working receptacle or draw pot 8 connected with the cooling chamber 7. The glass producing materials are adapted to be charged into the melting tank through a doghouse or open compartment 9 and may be melted therein by any suitable heating means to provide the mass of molten glass 10. The glass after being produced within the melting tank 5 flows slowly therethrough into the refining chamber 6 and thence through the cooling chamber 7 into the working receptacle or draw pot 8 from which it may be drawn in the form of a sheet 11 or formed into any other suitable kind of glassware.

The refining end or chamber 7 is provided with a bottom 12, outer side walls 13 and 14 and inner side walls 15 and 16, said inner side walls being spaced from the outer side walls to provide the spaces or passages 17 and 18 therebetween. The refining chamber is covered by a suitable cap 19 which also constitutes a cover for the passages 17 and 18. Arranged within the outer side walls 13 and 14 at the end of the refining chamber adjacent the cooling chamber 7 are the overflow spouts 20 and 21 having arranged therebeneath receptacles 22 adapted to contain water or other liquid which will cause the molten glass to solidify as it flows thereinto and be converted into cullet.

In operation, as the mass of molten glass 10 flows from the melting tank 5 into the refining chamber 6, the edge or border portions of the mass of glass will flow into the passages 17 and 18 and subsequently exteriorly of the furnace through the overflow spouts 20 and 21. Thus, the border portions of the glass which flows from the melting tank and which border portions ordinarily contain the greatest impurities or defects, will be caught within the passages 17 and 18 and maintained separated from the main body of glass which, being of a better quality, is allowed to flow into the refining chamber and thence through the cooling chamber into the draw pot from which it is removed in the form of a sheet of other glass article.

As stated above, a certain amount of scum or dirty surface may be formed upon the mass of glass throughout the width of the melting tank and in order to prevent this dirty surface glass from passing into the refining chamber, a floater member 23 may be provided, said floater being immersed within the molten glass for a suitable distance and extending between the inner side walls 15 and 16 of the refining chamber. This floater is so arranged that it will dam up the surface glass and divert it from its normal course causing it to flow toward the sides of the furnace into the passages 17 and 18. Thus, only the very best quality of glass will be allowed to pass into the refining chamber with the result that the sheet produced should be of a greatly improved quality.

The glass flowing through the spouts 20 and 21 will tend to exert or create a constant drag or pull upon the edge or border portions of the glass within the melting tank so as to aid in insuring a constant movement of the said edge portions thereby tending to eliminate the formation of stagnant glass along the side walls of the melting tank, which stagnant glass sometimes becomes devitrified causing what is known in the art as dog-metal. Furthermore, the glass flowing through the passages 17 and 18 will tend to prevent the dissipation of heat from the body of glass within the refining chamber through the inner side walls thereof and will therefore act as an insulating medium to maintain the glass within the refining chamber at a substantially uniform temperature. By maintaining the glass within the refining chamber at a substantially uniform temperature, the flow of the glass therethrough will be more uniform and the dangers resulting from stagnant glass will be eliminated.

Figure 3:
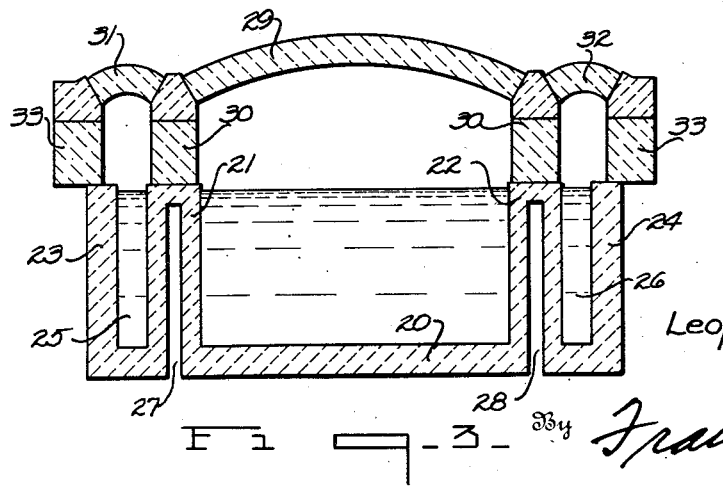
Fig. 3 is a transverse section showing a slightly modified construction.

In Fig. 3 is shown a slightly modified construction wherein the refining chamber consists of the bottom wall 20, inner side walls 21 and 22 and the outer side walls 23 and 24 forming the passages 25 and 26 therebetween. In this type of furnace, the inner walls 21 and 22 are preferably of substantially inverted U-shape so as to create the flues 27 and 28 therein through which may be passed air or any other suitable medium to prevent overheating and retard disintegration of the inner side walls. Also, with this construction, instead of using a single cap over the entire refining end of the furnace, the main cap 29 covers only that portion of the molten glass between the inner side walls 21 and 22, said cap being supported upon walls 30. Individual caps 31 and 32 are provided for the passages 25 and 26 respectively, said caps being supported upon the walls 30 and 33.

In Figs. 4 and 5 is disclosed a somewhat modified design of furnace including a melting tank 34, a refining chamber 35, a cooling chamber 36 and a relatively shallow working receptacle or draw pot 37 from which the sheet 28 is adapted to be drawn. The refining chamber, cooling chamber and draw pot are preferably of the same width as shown in Fig. 4 and these portions of the furnace are provided with outer side walls 39 and 40 and inner side walls 41 and 42 spaced from the outer side walls to provide passages 43 and 44 therebetween. The draw pot 37 is also provided with the outer and inner front walls 45 and 46 respectively spaced from one another to provide the passage 47 therebetween. A floater member 48 extends transversely of the furnace between the inner side walls 41 and 42 of the refining chamber. In this type of furnace, the glass is first produced within the melting tank 34 and then caused to flow through the refining chamber 35 and cooling chamber 36 into the draw pot 37.

As described hereinabove in connection with the form of invention illustrated in Figs. 1 and 2, the edge or border portions of the mass of molten glass flowing from the melting tank and which border portions contain the principal defects, will be caused to flow into the passages 43 and 44 while the main body of glass, which is usually of a better quality, will be permitted to flow into the refining chamber between the inner side walls thereof. The glass flowing into the passages 43 and 44 will be permitted to flow exteriorly thereof through the outlet spouts 49 and 50. The floater 48 will tend to divert the surface glass which might also contain a certain percentage of impurities, toward the sides of the furnace into the passages 43 and 44.

The advantages to be gained by the use of this construction are substantially the same as those set forth hereinabove in connection with the form of invention shown in Figs. 1 and 2. In other words, the poorer quality of glass or that glass containing the principal glass defects will be caused to flow into the passages 43 and 44 and in this way maintained separated from the better quality of glass which is permitted to flow through the refining and cooling chambers to the draw pot. Also, the glass within the passages 43, 44 and 47 will function to prevent dissipation of heat from the glass within the refining and cooling chambers and also the draw pot so as to maintain this glass at a substantially uniform temperature. Since the glass is maintained at a substantially uniform temperature, the flow movement throughout its width will be more or less uniform so that devitrification of glass within these portions of the furnace will be greatly reduced if not entirely eliminated. Furthermore, the glass flowing through the outlet spouts 49 and 50 will tend to create a constant drag upon the border portions of the glass within the melting tank and thus aid in insuring a more or less constant movement thereof.

The form of furnace illustrated in Fig. 6 is the same in all respects as the furnace shown in Fig. 4 with the exception that the inner and outer side walls of the refining chamber 35, cooling chamber 36 and draw pot 37 converge forwardly as shown instead of being arranged parallel with one another as in Fig. 4. The type of furnace shown in Fig. 7 is also substantially the same as that shown in Fig. 4, the principal difference being that the inner and outer side walls of the refining chamber 35 are substantially parallel with one another as are the inner and outer side walls of the draw pot 37 while the inner and outer side walls of the cooling chamber 36 converge forwardly from the refining chamber to the draw pot.

In Figs. 8 to 10 inclusive has been shown a still further modified furnace construction embodying the principles of the present invention. This furnace includes a melting tank 51, a refining chamber 52, a cooling chamber 53 and a draw pot or working receptacle 54. The refining chamber 52 is provided with the outer side walls 55 and 56 and the inner side walls 57 and 58 spaced from the outer side walls to provide the passages 59 and 60 therebetween. The outer side walls 55 and 56 are continuations of the side walls of the melting tank which overlap the refining chamber. It will be noted that the cooling chamber 53 is somewhat narrower than the refining chamber 52 and includes the inner side walls 61 and 62, the inner side walls 57 and 58 of the refining chamber extending beyond the outer side walls thereof and overlapping the cooling chamber constituting the outer side walls thereof which are spaced from the inner side walls to provide the passages 63 and 64 therebetween. Likewise, the draw pot 54 is narrower than the cooling chamber 53 and includes the inner side walls 65 and 66, the inner walls 61 and 62 of the cooling chamber overlapping and forming the outer side walls of the draw pot so that passages 67 and 68 are formed therebetween.

Immersed within the molten glass at the inner end of the refining chamber and extending between the inner side walls thereof is a floater 69 while a similar floater 70 extends between the inner side walls of the cooling chamber and a floater 71 between the inner side walls of the draw pot. In the operation of this design of furnace, the molten glass is first produced within the melting tank 51 and is then caused to slowly flow through the refining chamber 52 and cooling chamber 53 into the draw pot 54 from which it may be drawn in the form of a sheet 72. As brought out above in connection with the other forms of the invention, the border portions of the molten glass within the melting tank, and which glass usually contains the greatest glass defects will be caused to flow into the passages 59 and 60 of the refining chamber while the main body of glass, which is of a better quality, will flow into the refining chamber proper, the floater 69 acting to divert the surface glass, which may also contain some glass defects, into the passages 59 and 60. However, after the glass passes into the refining chamber and before it passes into the cooling chamber, a certain amount of scum may form upon the surface of the glass or gather along the edges of the refining chamber. Thus, in order to remove these defects, the border portions of the glass flowing from the refining chamber will be caused to flow into the passages 63 and 64 of the cooling chamber while the main body of glass will pass into the cooling chamber proper, the surface glass being diverted by means of the floater 70 into the said passages 63 and 64. Likewise, a certain amount of scum may form upon the surface of the glass within the cooling chamber so that the edge portions of this glass are caused to flow into the passages 67 and 68 and the surface glass also diverted thereinto by the floater 71. With this arrangement, the glass passes through a plurality of refining stages or, otherwise stated, the defects in the glass are removed therefrom at a plurality of points as the glass flows through the furnace so that by the time the glass reaches the draw pot, it should be of a very high quality and relatively free from all common glass defects.

In Fig. 10 the sheet 62 has been shown as being drawn in accordance with the Colburn process wherein the sheet is drawn upwardly for a suitable distance and then deflected into the horizontal plane about a bending member or roll 73 and passed horizontally through an annealing leer. On the other hand, in Fig. 11 the sheet has been shown as being drawn in accordance with the so-called Fourcault process wherein a floater or deputer 74 is immersed within the molten glass to create a sheet source under pressure and from which source the sheet is adapted to be drawn vertically and passed vertically through an annealing leer 75 between a plurality of pairs of rolls 76. It is to be understood that the different types of furnaces herein shown may be used in connection with any type of sheet forming or glassware forming mechanism without departing from the spirit of the invention. Also, any one of the furnace designs may have the inner side walls of substantially inverted U-shaped formation as shown in Fig. 3.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In a furnace construction, a tank having a melting portion within which is adapted to be produced a mass of molten glass and a refining portion for receiving the glass from the melting portion, said refining portion having inner and outer side walls spaced to create relatively narrow passages therebetween within which the border portions of the glass flowing from the melting portion are received and conveyed exteriorly of the furnace.

2. In a furnace construction, a tank having a melting portion within which is adapted to be produced a mass of molten glass and a refining portion for receiving the glass from the melting portion, said refining portion having inner and outer side walls spaced to create relatively narrow passages therebetween within which the border portions of the glass flowing from the melting portion are received and conveyed exteriorly of the furnace, and a floater member arranged transversely of the tank for directing the surface glass of the main body of glass into the passages.

3. In a furnace construction, a tank adapted to contain a mass of molten glass and having inner and outer side walls spaced from one another to form relatively narrow passages therebetween, the tank being adapted to contain molten glass between its inner walls and also within the passages between its inner end outer side walls, said outer side walls being provided with openings beneath the level of the molten glass to allow the molten glass within said passages to flow therefrom exteriorly of the furnace.

4. In a furnace construction, a tank adapted to contain a mass of molten glass and having a melting end and a working end, said working end having inner and outer spaced side walls adapted to receive molten glass therebetween from the melting end and convey its exteriorly of the furnace.

5. In a furnace construction, a furnace including a melting portion, a refining portion and a working portion, said refining portion being provided with spaced inner and outer side walls adapted to receive molten glass therebetween from the melting portion and convey it exteriorly of the furnace.

6. In a furnace construction, a furnace including a melting portion and a fining portion, said fining portion being provided with spaced inner and outer side walls adapted to receive molten glass therebetween from the melting portion and convey it exteriorly of the furnace, the inner side walls of said fining portion being provided with flues for receiving a cooling medium therethrough.

7. In a furnace construction, a furnace including a melting portion, a refining portion, a cooling portion and a working portion, said refining, cooling and working portions being provided with spaced inner and outer side walls adapted to receive molten glass therebetween from the melting portion and convey it exteriorly of the furnace.

8. In a furnace construction, a furnace including a working receptacle adapted to contain molten glass and having inner and outer spaced side walls between which is also received molten glass, the outer side walls of the receptacle being provided with openings beneath the level of the molten glass to allow the molten glass between said inner and outer walls to flow therefrom exteriorly of the furnace.

9. In a furnace construction, a furnace including a working receptacle adapted to contain molten glass and having inner and outer spaced side and front walls between which is also received molten glass.

10. The process of producing molten glass, which consists in establishing a mass of molten glass in the melting zone of a tank furnace, flowing the glass from the melting zone through a fining zone, separating relatively narrow border portions of the glass from the main body thereof as the glass flows into the fining zone in maintaining the border portions of the glass in enveloping relation to the main body thereof, and in subsequently flowing the border portions exteriorly of the furnace.

11. The process of producing molten glass, which consists in establishing a mass of molten glass in the melting zone of a tank furnace, continuously flowing glass from said melting zone into a working zone, in maintaining a body of molten glass in surrounding relation to the glass in said working zone, in continuously flowing glass from said body of glass exteriorly of the furnace and in continuously replenishing said body with additional glass.

12. The process of producing sheet glass, which consists in establishing a mass of molten glass in the melting zone of a tank furnace, flowing the glass from the melting zone through a fining zone into a working zone, separating the border portions of the glass from the main body thereof as the glass flows into the refining zone, maintaining the separated border portions in enveloping relation to the main body of glass within the refining and working zones, in forming a sheet from the main body of glass in said working zone, and in causing the separated border portions of the molten glass to flow exteriorly of the furnace.

13. In a furnace construction, a melting tank within which is adapted to be produced a mass of molten glass, a refining chamber associated with the melting tank and including spaced vertical walls between which the central body portion of glass flowing from the melting tank is received, and additional vertical walls arranged outwardly of and cooperating with the first-mentioned walls to form relatively narrower passages for receiving the border portions of the glass flowing from the melting tank.

14. In a furnace construction, a melting tank within which is adapted to be produced a mass of molten glass, a refining chamber associated with the melting tank and including spaced vertical walls between which the central body portion of glass flowing from the melting tank is received, and additional vertical walls arranged outwardly of and cooperating with the first-mentioned walls to form relatively narrower passages for receiving the border portions of the glass flowing from the melting tank, the distance between the two inner walls being relatively greater than that between the inner walls and their respective outer walls.

15. In a furnace construction, a melting tank within which is adapted to be produced a mass of molten glass, a refining chamber associated with the melting tank for receiving the molten glass therefrom, said refining chamber having spaced inner and outer walls at each side thereof, the inner walls being adapted to receive therebetween the central body portion of glass flowing from the melting tank, and the said inner walls cooperating with the respective outer walls to form relatively narrower passages for receiving therein the border portions of the glass flowing from the melting tank.

16. The process of producing molten glass, which consists in establishing a mass of molten glass in the melting zone of a tank furnace, flowing the central body portion of the glass into a refining zone and confining it between spaced walls, and in flowing the border portions of the glass from the melting zone into said refining zone in surrounding relation to the body of glass therein and in contact with the confining walls thereof.

17. The process of producing molten glass, which consists in establishing a mass of molten glass in the melting zone of a tank furnace, flowing the central body portion of the glass into a refining zone and confining it between spaced walls, and in flowing the relatively narrower border portions of the glass from the melting zone into said refining zone in surrounding relation to the body of glass therein and in contact with the confining walls thereof, in working the main body of glass within the refining zone, and in causing the surrounding border portions to flow exteriorly of the furnace.

Signed at Lancaster, in the county of Fairfield and State of Ohio, this 10th day of May, 1928.

LEOPOLD MAMBOURG.